United States Patent

[11] 3,580,045

| [72] | Inventor | Raymond H. Pfrehm<br>Houston, Tex. |
|---|---|---|
| [21] | Appl. No. | 745,256 |
| [22] | Filed | July 16, 1968 |
| [45] | Patented | May 25, 1971 |
| [73] | Assignee | Esso Research and Engineering Company |

[54] METER PROVER
15 Claims, 5 Drawing Figs.

[52] U.S. Cl. .................................................. 73/3,
137/625.28
[51] Int. Cl. ...................................................... G01f 25/00
[50] Field of Search ........................................... 73/3;
137/625.28, (Inquired)

[56] References Cited
UNITED STATES PATENTS

| 50,053 | 9/1865 | Tremain | 137/625.68 |
|---|---|---|---|
| 1,675,307 | 6/1928 | Dake | 137/625.68 |
| 2,792,705 | 5/1957 | Barrett | 73/3 |
| 3,120,118 | 2/1964 | Boyle | 73/3 |
| 3,135,114 | 6/1964 | Granberg | 73/200 |
| 3,334,650 | 8/1967 | Lowry et al. | 137/375 |
| 3,402,731 | 9/1968 | Martin | 137/375 |
| 3,403,544 | 10/1968 | Francisco | 73/3 |

OTHER REFERENCES

Chi a paper in Advances in Cryogenic Engineering Vol. 10, Proceedings of the 1964 Cryogenic Engineering Conference (Sections A—L) K. D. Timmerhaus, ed. Distributed by Plenum Press New York 1965 pages 330—333 relied upon copy in group 340 TP 480 A3

Primary Examiner—S. Clement Swisher
Attorneys—Thomas B. McCulloch, Melvin F. Fincke, John S. Schneider, Sylvester W. Brock, Jr., Kurt S. Myers and Timothy L. Burgess ABSTRACT: A bidirectional meter prover adapted to be connected to a conduit having a meter arranged therein is provided with a valve means connected to the calibration barrel of the meter prover and to the meter such that the valve means is rapidly shifted for movement of the piston in the meter prover in either direction in the calibration barrel for proving the meter. The meter prover is adapted for proving meters used for metering cryogenic liquids with the cryogenic liquid being introduced into the meter proving system and with the cryogenic liquid being vented as the system is cooled to equilibrium temperature; venting is stopped while introduction of cryogenic liquid is continued until thermal equilibrium is reached. Thereafter, the system is operated to prove the meter at equilibrium temperature.

Patented May 25, 1971

INVENTOR.
RAYMOND H. PFREHM,

BY
ATTORNEY.

INVENTOR.
RAYMOND H. PFREHM,

ATTORNEY.

METER PROVER

BACKGROUND OF THE INVENTION

1. Field of the Invention

The present invention is directed to measurements of cryogenic liquids. More particularly, the invention is directed to a cryogenic meter prover system including a meter for measurement of cryogenic liquids. In its more specific aspects, the invention is concerned with proving and calibrating meters used in measuring cryogenic liquids at temperatures and/or pressures approximately at or somewhat lower than the boiling point of the cryogenic liquid.

2. Description of the Prior Art

It has been known heretofore to prove and calibrate meters used in measuring fluids such as liquids flowing through pipelines and the like. It has also been known to employ bidirectional meter provers in such service. A bidirectional meter prover is one employing a calibration barrel having spaced detection points and in which a piston moves in either direction in the calibration barrel due to the flow of fluid in the calibration barrel. The piston serves to actuate a detection means which allows the determination of the amount of liquid in the calibration barrel with respect to the amount of liquid flowing through the meter.

Heretofore, the measurement of cryogens has been accomplished by weighing the container in which the cryogens are stored before and after the cryogens are stored therein. However, this technique is suitable where small amounts of cryogenic liquids are involved, but with the advent of transportation of liquefied natural gas through pipeline and by tanker ship it is no longer practical to measure the amount of cryogens by weighing the container before and after. Likewise, the space program utilizes enormous quantities of cryogens such as oxygen, hydrogen and the like as propellants for the huge rockets which are required to propel space vehicles into orbit and to and from the moon and the like. The present invention allows the measurement of cryogenic liquids and calibration of meters involved in such measurement so that accuracy is assured.

Specific prior art considered with respect to this invention include the following listed U.S. patents.

U.S. Pat. No. 3,021,703

U.S. Pat. No. 1,747,899

U.S. Pat. No. 323,367

SUMMARY OF THE INVENTION

The present invention may be briefly described as a bidirectional meter prover adapted to be connected to a conduit having a meter arranged therein and having an elongated calibration barrel provided with a piston means longitudinally movable in the calibration barrel in either direction. The calibration barrel has means on the exterior thereof for detection of the piston means. A particular feature of the present invention is a valve means separately fluidly connected to the first and second ends of the calibration barrel; the valve means having an inlet means and an outlet means. Arranged in the valve means which suitably comprises a housing having a honed inner surface is a longitudinally movable spool means for directing fluid to a selected end of the calibration barrel. The longitudinally movable spool means is provided with means for operating the spool means for moving it longitudinally within the valve means to direct the cryogenic liquid into either end of the calibration barrel.

The present invention may also be summarized as involving a method of employing a bidirectional meter prover system in proving a meter therein for cryogenic liquids wherein there is introduced into the meter prover system a cryogenic liquid. Since the meter prover system is ordinarily at ambient temperatures, the system must be cooled down to thermal equilibrium of the cryogenic liquid before it can be used in proving the meter used in cryogenic liquids.

In accordance with the present invention, a portion of the cryogenic liquid ahead of the meter is vented to prevent runaway velocities of the meter caused by vaporized cryogenic liquid. A portion of the cryogenic liquid is vented after the meter prover system while the temperature of the meter prover system is being reduced. After the temperature has been reduced to a sufficiently low degree approaching thermal equilibrium, venting is discontinued and the introduction of the cryogenic liquid continued until the equilibrium temperature of the system using a particular cryogenic liquid is reached. Thereafter the meter prover system is operated at the equilibrium temperature in proving the meter. A portion of the cryogenic liquid may be vented ahead of the prover system and after the meter.

VARIABLES OF THE INVENTION

There are many cryogenic liquids which may be used in the practice of the present invention. The more common of these cryogenic liquids include nitrogen, oxygen, hydrogen, liquefied natural gas, and the like. The following table lists a number of cryogenic liquids which may be used in the present invention, and gives the boiling points in ° C. of the cryogenic liquids.

| Cryogenic liquids: | B.P. ° C. |
| --- | --- |
| Nitrogen | −195.8 |
| Oxygen | −183.0 |
| Air | −194.2 |
| Hydrogen | −252.8 |
| Liquefied natural gas | −156.0 |
| Methane | −161.5 |
| Ethane | −88.3 |
| Helium | −268.9 |
| Argon | −185.7 |
| Neon | −245.9 |
| Xenon | −107.1 |
| Ethylene | −103.9 |
| Krypton | −152.9 |

While these cryogenic liquids may be used in the practice of the present invention, other cryogenic liquids at low temperatures may also be employed.

One of the important features of the present invention is the sealing means employed in the piston means of the meter prover. Without proper cryogenic temperature-resistant sealing means the proving of the meter for cryogenic service is difficult, if not impracticable. Among the sealing means found suitable is Teflon which is a polymer of tetrafluoroethylene; Micarta which is cloth or fibers impregnated with phenolformaldehyde resins; and nylon. All three of these materials perform admirably in this invention, but Teflon is preferred.

Turbine meters have been found suitable in measurement of cryogenic liquids such as nitrogen at a temperature of about −310° F. and about 65 pounds per square inch gauge to test the clearances of the meter. The nominal clearance is increased from 0.00025-inch between the shaft and sleeve bearing to 0.00055-inch. However, other clearances may be used. The calibration barrel of the present invention is suitably bored and honed to a maximum tolerance of ±0.003 inches after all welding on the barrel has been completed. The minimum wall thickness is about 0.250 inches except at the proximity switch mountings where the wall thickness is about 0.200 inches. All welding materials and techniques are compatible for −330° F. temperature service. All fittings are ASA 1500 and are made of 304 stainless steel. Likewise, all connecting piping is 304 stainless steel and is welded to the prover barrel. A feature of the present invention is a four-way spool valve having a tubular housing which is also bored and honed to a tolerance of ±0.002 inches diameter after all welding is completed. The spool is operated with an operator which may be manual or motor driven and suitably with a handcrank which requires 1.5 turns and can be rapidly operated in approximately 2 seconds.

The proximity switches are suitably proximity switches such as are on the market. These proximity switches such as Honeywell 7FB42 Proximity Sensors are constructed in an unpotted condition. The reason for eliminating the potting is to eliminate the possibility of coil damage due to difference in coefficients of expansion of the potting compound and the copper wire.

It is desirable to insulate the system and in this connection in a meter installation including the prover system frost may be allowed to build up on the calibration barrel and the connections thereto as insulation or the system may be insulated with perlite or polyurethane foam; or multilayer insulations; preferably the system is insulated with vacuum evacuated loose fill perlite.

The piston may suitably be constructed of 304 stainless steel and may be made out of aluminum. In either case, the piston is provided with a mild steel band, welded around the center of the piston to activate the proximity switches, and is provided with seal rings and wear rings both of which are spring-loaded. In any event, the piston is made of such light weight as is possible with respect to the materials and construction employed.

It is contemplated that the meter prover system including the meter may be placed on a trailer which may be a 4-wheel tandem trailer suitably provided as desired with accessories for highway operation.

BRIEF DESCRIPTION OF THE DRAWING

The present invention will be further illustrated by reference to the drawing in which.

DESCRIPTION OF THE PREFERRED MODES AND EMBODIMENTS WITH RESPECT TO THE DRAWING

Figure 1:
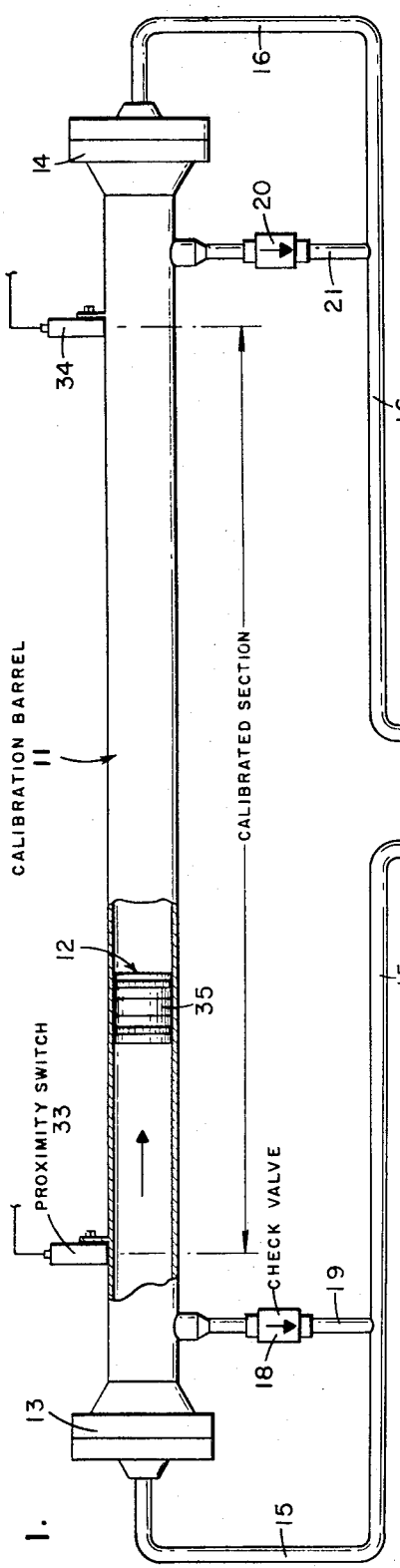
FIG. 1 is a front elevational view of the present invention.
Figure 2:
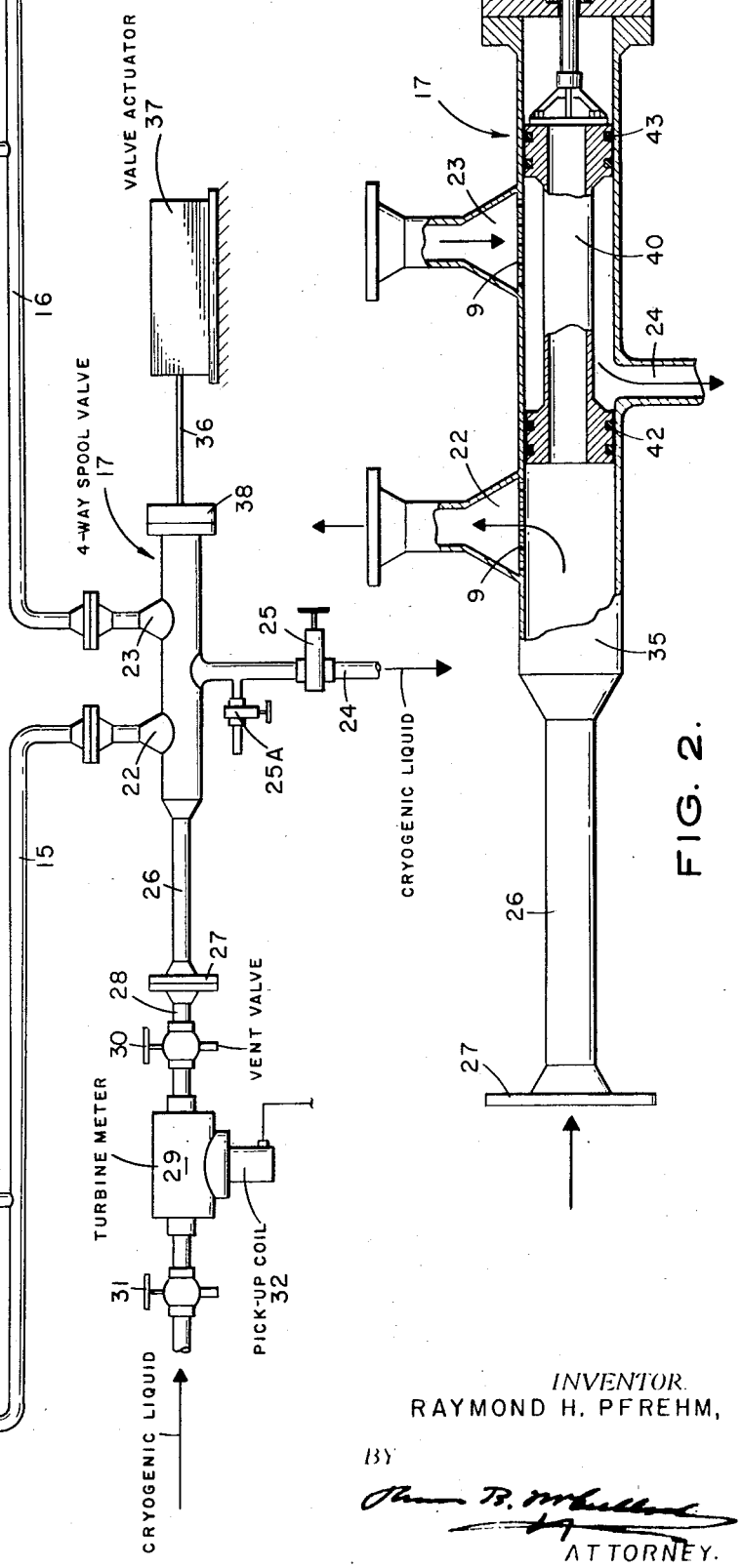
FIG. 2 shows the four-way spool valve of the present invention.
Figure 3:
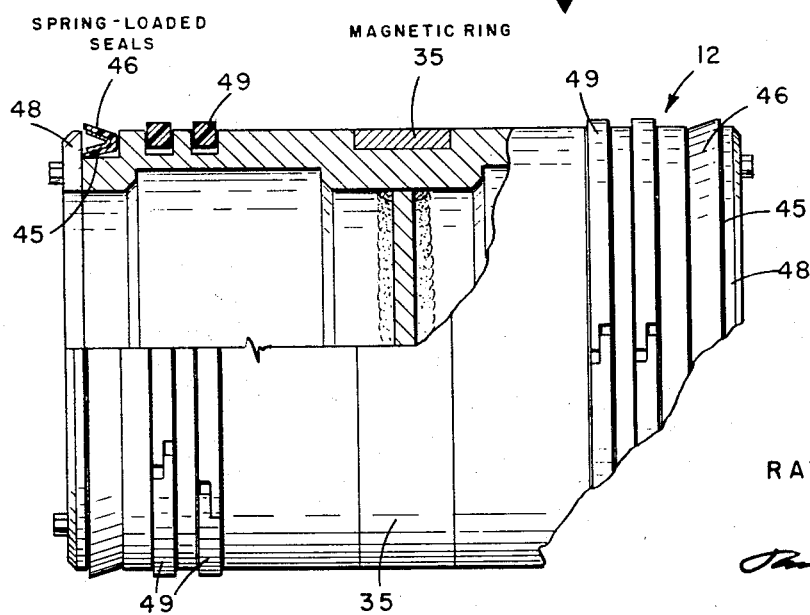
FIG. 3 is a view taken along the lines 3–3 of FIG. 1, illustrating a partial cross section of the piston.

Referring now to the drawing in which identical numerals designate identical parts and particularly FIGS. 1—3, numeral 11 designates a calibration barrel of a meter prover having a piston means 12 arranged therein for bidirectional travel. The calibration barrel 11 has flanged ends 13 and 14 which are connected respectively by conduits 15 and 16 to a four-way spool valve 17 which will be described further and in more detail hereinafter. The conduit 15 is connected to the calibration barrel 11 by a check valve means 18 including a conduit connecting means 19 and the conduit 16 is connected to the calibration barrel 11 by check valve means 20 including a conduit 21.

The conduits 15 and 16 connect to the four-way spool valve 17 by flanged ports 22 and 23, respectively. The four-way spool valve 17 has an outlet 24 controlled by valve means 25 and a coaxial 26 connected by flange 27 to conduit 28 in which is arranged a turbine meter 29. A vent line controlled by valve 25A is connected into lateral line 24 between valve 25 and spool valve 17. Conduit 28 is provided with vent valves 30 and 31 arranged upstream and downstream of the turbine meter 29. The turbine meter 29 is suitably provided with a turbine meter pickup coil 32 which is suitably connected to a recording device not shown. The calibration barrel 11 is provided with proximity switches 33 and 34 which are actuated on passage of the piston 12 thereby by the steel band 35 arranged thereon. The proximity switches 33 and 34 cooperate with the turbine meter pickup coil 32 in calibrating the meter 29 which is well known in the art.

Referring now to FIGS. 1 and 2, the four-way spool valve 17 shown in detail is comprised of a tubular housing 35, the interior of which is bored and honed to provide a smooth surface as has been described. The spool valve 17 has a flanged ports 22 and 23 which have also been described, and an inlet 26 which connects by the flange 27 to the conduit 28. An operating shaft 36 provided with an operator 37 which suitably may be a handcrank or motor extends through the flange 38 and seal means 39. The shaft 36 connects to the spool 40 which is suitably sealed with the inner surface 41 of the tubular housing 35 by sealing means 42 and 43. Ports 22 and 23 are perforated as at 9 to allow passage without damage to the seals of the spool.

Referring now to FIG. 3, the piston 12 is suitably constructed of aluminum or 304 stainless steel having a ferromagnetic metal ring 35 as has been described. The piston 12 is provided in each end thereof with external grooves 45 having spring-loaded Teflon seals 46 arranged therein. The seals 46 are held in place by retainer rings 48. Also provided in the outer periphery of piston 12 are a plurality of Teflon-wear rings 49 which tend to prevent excess wear to the seal rings 46. The rings 46 and 49 maintain a tight engagement against the inner wall of barrel 11. A ferromagnetic metal ring 35 is imbedded in the outer wall of piston 12 with the remainder of the piston body being formed of aluminum.

Figure 4:
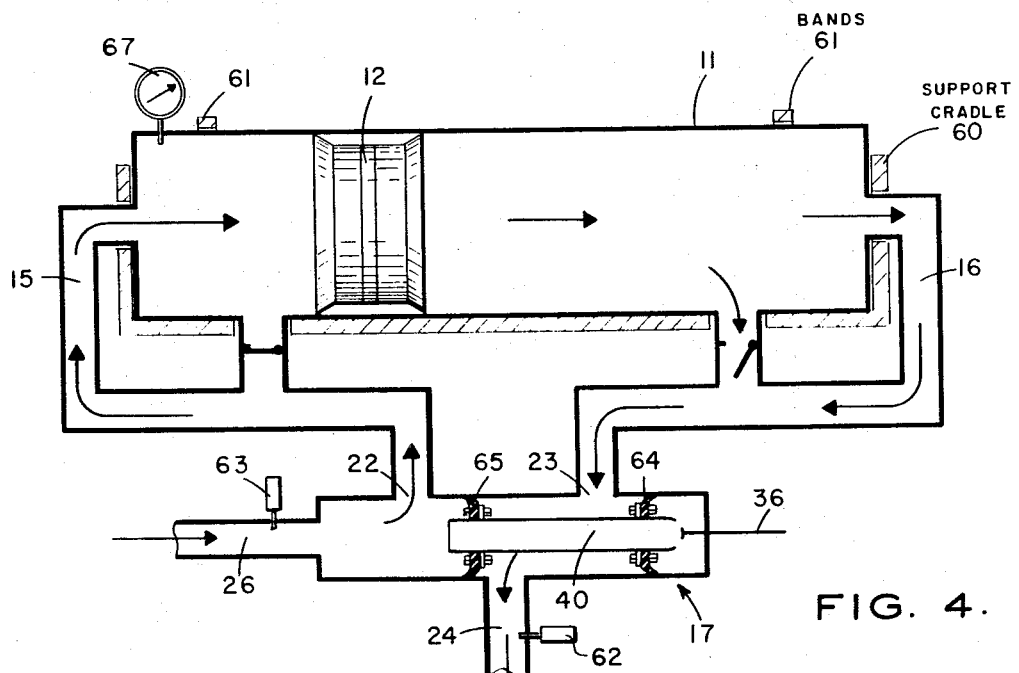
FIG. 4 is a schematic view of the prover system apart from the turbine meter and the venting system and shows a different type of sealing means for the spool valve.
Figure 5:
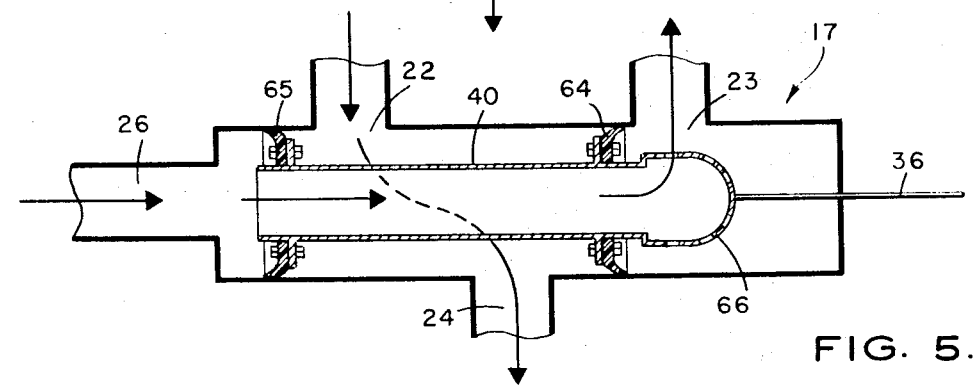
FIG. 5 shows the spool valve in a different position than in FIG. 4.

Referring to FIGS. 4 and 5, a schematic showing of the apparatus of FIGS. 1 and 3 omitting the turbine meter but including other structure is shown. In FIGS. 4 and 5 similar numerals will designate similar parts.

Referring particularly to FIG. 4, the calibration barrel 11 is shown with the piston 12 arranged therein with the calibration barrel 11 supported in a cradle 60 which suitably may be a larger pipe cut to accommodate the barrel 11 and with closed ends as desired to support the calibration barrel 11. It will be noted that the calibration barrel 11 is confined in the cradle 60 by confining bands 61 and the calibration barrel 11 is only loosely arranged in the cradle 60, it having been found important to support the calibration barrel to prevent any bending and other deformation of the calibration barrel. While such bending or deformation may be small, in view of the desired accuracy of the device, it is desirably to maintain and support same horizontally and to provide a suitable supporting means such as the cradle 60. Like in FIG. 1, the spool valve 17 is connected to the calibration barrel 11 by conduits 15 and 16 which connect to the spool valve 17 by port means 22 and 23, the outlet 24 being shown without the valve 25. The outlet 24 includes a temperature sensor 62 to allow correction to be made for the low temperature operations. Likewise, inlet 26 includes a temperature sensor 63 for the same purpose.

It is noted that the spool 40 is provided with cup-shaped sealing means 64 and 65 on each end thereof rather than the spring-loaded Teflon seals such as shown in FIG. 3. The seals 64 and 65 should be constructed with similar materials as the seals shown in FIG. 3.

In FIG. 4 the meter prover device is shown in operation with liquid nitrogen being introduced through the inlet 26 after passing through the meter 29 (not shown in this FIG.) port 22, conduit 15 and against the piston 12 which travels in the direction of the arrows. The liquid nitrogen leaves the calibration barrel 11 in the direction of the arrows and around the spool 40 to outlet 24.

In FIG. 5, however, the spool 40 has been moved to the left and liquid nitrogen introduced through inlet 26 passes through the tubular spool 40 and thence through a yoke means 66 connected to the operator 36 into port 23 and thence through conduit 16 to cause movement of the piston in the other direction as described in the Pfrehm patent supra. The temperature sensors 62 and 63 are used to record the temperature and a pressure sensor 67 is employed to make the pressure correction.

In employing the device of the present invention, it is important that care be taken that the turbine meter 29 shown in FIG. 1 is not subjected to runaway velocities. To overcome this problem, the initial boiling-off of nitrogen in the conduit 28 (FIG. 1) upstream of the meter and prover was vented at the valve 31 while valve 25 was closed, and continued until liquid nitrogen emerged from valve 31. Nitrogen was also vented through the valve 30 downstream of the meter. Venting was also subsequently used downstream of the prover by way of valve 25A as the cooling down process progressed. When the inlet temperature to the prover reached −270° F. or lower, venting of the nitrogen vapors to atmosphere was stopped, and pumping was started and the full liquid nitrogen stream was pumped through the meter 29 and thence into the prover with boil-off nitrogen returning to the vapor space of the storage tank (not shown) to which conduits 28 and 24 connect and cooling continued until thermal equilibrium was reached; after several displacements of the piston, the prover was ready to operate.

In operation of the prover, the meter registration one-way was recorded and the total meter registration for a round trip was also recorded. Likewise, the displacement for a round trip in seconds was recorded. The proving pressure and the inlet and outlet temperatures in ° F. were also recorded. The meter factor was determined as follows:

$$\text{Meter factor} = \frac{24{,}000^*}{\text{Rd. trip mtr. registration}} \cdot \frac{\text{prover vol. at } -310° \text{ F.}}{\text{prover vol. at avg. } ° \text{ F.}}$$

*An arbitrary unit of "prover volume" that yields a meter factor of almost unity.

An example of the test data is as follows:

| Piston displacement (meter registration) | | Round trip time, seconds | Pressure, p.s.i.g. | Temperature | | |
|---|---|---|---|---|---|---|
| One way | Round trip | | | Inlet, ° F. | Outlet, ° F. | Average, ° F. |
| 11,786 | 23,510 | 83.6 | 105 | −312 | −308 | −310 |
| 11,786 | 23,509 | 83.6 | 105 | −312 | −308 | −310 |
| 11,789 | 23,513 | 83.6 | 105 | −312 | −307 | −309.5 |
| 11,791 | 23,518 | 83.4 | 105 | −312 | −308 | −310 |
| Average | 23,512.5 | 83.55 | 105 | −312 | −307.75 | −309.875 |

NOTE:
Maximum deviation in registration=0.038%, i.e., the repeatability of the prover.
Prover volume at T avg.=−309.875° F.=98.435306 gal./rd trip. (This volume was determined by direct interpolation of Table I.)

$$\text{Flow rate} = \frac{98.435306 \cdot 60}{83.55} = 70.69 \text{ g.p.m.}$$

$$\text{Meter's pulses per gallon} = \frac{23{,}512.5}{98.435306} = 238.86$$

and $$\text{Meter factor} = \frac{24{,}000 \cdot 98.435019}{23{,}512.5 \cdot 98.435306} = \underline{1.02073}.$$

TABLE I.—PROVER VOLUME
[0 p.s.i.g.]

| At (° F.)— | Gal./round trip |
|---|---|
| +60 | 99.28469 |
| −305 | 98.446501 |
| −306 | 98.444205 |
| −307 | 98.441908 |
| −308 | 98.439612 |
| −309 | 98.437315 |
| −310 | 98.435019 |
| −311 | 98.432723 |
| −312 | 98.430426 |
| −313 | 98.428130 |
| −314 | 98.325833 |
| −315 | 98.423537 |
| −316 | 98.421241 |
| −317 | 98.418944 |
| −318 | 98.416648 |
| −319 | 98.414351 |
| −320 | 98.412055 |

The data from two runs conducted within two weeks of each other are shown in Table II.

TABLE II
First run

| | Rate, g.p.m. | Meter factor (corrected) | Average pressure p.s.i.g. | Average temp., ° F. | Repeatability of the prover, percent |
|---|---|---|---|---|---|
| No. of runs:* | | | | | |
| 8 | 70.72 | 1,02073 | 103 | −309.75 | 0.110 |
| 4 | 54.80 | 1,02125 | 75 | −309.5 | 0.013 |
| 4 | 64.25 | 1,02160 | 85 | −309.5 | 0.038 |
| 3 | 51.06 | 1,02402 | 60 | −309.5 | 0.038 |
| 3 | 42.98 | 1,02349 | 96 | −307.8 | 0.009 |
| 4 | 33.33 | 1.02216 | 133 | −306 | 0.038 |
| 4 | 70.69 | 1,02073 | 105 | −209.875 | 0.038 |
| 4 | 59.06 | 1,02000 | 76 | −309.75 | 0.106 |
| 3 | 57.53 | 1,01993 | 85.67 | −309.835 | 0.008 |

Second run

| 5 | 55.82 | 1,01896 | 68 | −310.75 | 0.076 |
| 9 | 67.18 | 1,01931 | 95 | −311.0 | 0.059 |
| 6 | 56.76 | 1,02050 | 72 | −310.25 | 0.085 |

*A run is a round-trip displacement of the piston.

Based on the results of meter proving tests in liquid nitrogen, it is apparent that the present invention is quite advantageous in that the meter factor deviation over the test range of 33 to 70 g.p.m. was slightly less than 0.5 percent. The deviation in meter registration per round trip for any given proving rate was 0.11 percent maximum (on 8 runs 0 70.72 g.p.m.) and 0.008 percent minimum (on 3 runs 0 57.53 g.p.m.). A summary of these results is shown in Table II referred to supra.

The variation between the inlet and outlet temperature is due to heat gain in the system which may be reduced to a minimum by frost build up as insulation or by use of other insulation which may be perlite or any other insulation such as polyurethane foam and the like. Measurement accuracy is increased as the temperature change in the nitrogen is reduced to a minimum. While saturated liquid nitrogen is, for all practical purposes, incompressible, its density will vary better than 0.35 percent per ° F.

The present invention is quite advantageous and useful and has been used successfully in calibrating turbine meters in liquid nitrogen service. It is also quite useful for other meters in cryogenic service such as liquefied natural gas and the like.

The present invention may be installed on tankers carrying liquefied natural gas and other cryogenic liquids or it may be located at the terminus of a pipe line or at the inlet line leading into storage or into a transporting medium such as a tank ship and the like.

The present invention has utility in the space program for calibrating meters used in metering liquid hydrogen and liquid oxygen in such programs.

The nature and objects of the present invention having been completely described and illustrated and the best mode and embodiment contemplated set forth what I wish to claim as new and useful and secure by Letters Patent is:

I claim:

1. A bidirectional meter prover adapted to be connected to a conduit having a meter arranged therein having an elongated calibration barrel provided with a piston means longitudinally movable in said barrel in either direction, said calibration barrel having means on the exterior thereof adjacent each end for detecting the movement of said piston means, which comprises:

tubular valve means separately fluidly connected to first and second ends of said calibration barrel;

said valve means having a separate coaxial inlet means and a separate lateral outlet means;

longitudinally movable open-ended tubular spool means in said valve means for directing fluid to a selected end of said calibration barrel; and means for operating said spool means by rapidly moving it longitudinally.

2. Apparatus in accordance with claim 1 in which the calibration barrel, the valve means, and the connections therebetween are covered by insulation means.

3. Apparatus in accordance with claim 2 in which the insulation means is polyurethane foam.

4. Apparatus in accordance with claim 2 in which the insulation means is frost.

5. Apparatus in accordance with claim 1 in which the piston means is provided with seal and wear rings comprised of tetrafluoroethylene polymer.

6. Apparatus in accordance with claim 1 in which the piston means is constructed of aluminum having a steel band around its center.

7. Apparatus in accordance with the claim 1 in which the calibration barrel is confined in a longitudinal, horizontal cradle-supporting means for supporting said barrel free of stress.

8. Apparatus in accordance with claim 1 in which the spool means is provided with cryogenic temperature resistant sealing means on each end of said spool means for sealing with the inner wall of said valve means, said spool means providing passage of fluid therethrough and therearound depending on its position in said valve means to an from said calibration barrel and from said inlet means to said outlet means.

9. Apparatus in accordance with claim 8 in which the spool means is provided with outwardly biased sealing means.

10. Apparatus in accordance with claim 8 in which the spool means is provided with cup-type sealing means.

11. Apparatus in accordance with claim 1 in which the piston means is provided with outwardly biased cryogenic temperature resistant seal and wear rings.

12. Apparatus in accordance with claim 1 in which:
   a. the tubular spool means is provided with sealing means on each end thereof;
   b. the calibration barrel, the valve means, and the connections therebetween are covered by insulation means;
   c. the piston means is provided with seal cryogenic temperature-resistant and wear rings;
   d. the piston means is constructed of aluminum having a steel band around its center;
   e. the calibration barrel is confined in a longitudinal, horizontal cradle supporting means; and
   f. the interior surfaces of the calibration barrel and the valve means are honed.

13. Apparatus in accordance with claim 12 in which:
   a. the insulation means is frost; and
   b. the seal and wear rings are comprised of tetrafluoroethylene polymer.

14. Apparatus for a cryogenic meter prover system which comprises in combination a tubular housing means;

coaxial inlet means connected to one end of said tubular housing;

first and second lateral spaced-apart ports connected to said tubular-housing means intermediate its ends;

outlet means connected to said tubular-housing means at a point substantially midway between said spaced-apart ports;

a tubular spool member arranged in said tubular housing having a center fluid conducting passageway;

cryogenic temperature-resistant annular-sealing means on each end of said spool member for sealing with the interior surface of said housing, the space between said sealing means defining an annular chamber exterior of said spool member; and means extending through said housing connected to said spool member for moving said spool member longitudinally in said tubular housing to thereby place said inlet means in selective communication through the interior of said spool member as a passageway with one of said ports while placing the other of said ports in communication with said outlet means via the annular chamber exterior of said spool member as a passageway whereby the differential pressure across each of said sealing means is minimized and equal to the differential pressure between said inlet means and outlet means;

said tubular-housing means being connected to the calibration barrel of a bidirectional meter prover by said spaced-apart ports and to the meter thereof by said inlet means.

15. Apparatus in accordance with claim 1 in which the meter is a turbine meter.